United States Patent

[11] 3,616,008

| [72] | Inventors | Paul W. Stump<br>North Olmstead;<br>James A. Huber, Strongsville; John M.<br>Lipinski, Cleveland, all of Ohio |
|---|---|---|
| [21] | Appl. No. | 820,462 |
| [22] | Filed | Apr. 30, 1969 |
| [45] | Patented | Oct. 26, 1971 |
| [73] | Assignee | Clevepak Corporation<br>Cleveland, Ohio |

[54] METHOD AND APPARATUS FOR MAKING A HELICALLY WOUND TUBE
6 Claims, 5 Drawing Figs.

[52] U.S. Cl. .................................................. 156/190, 156/195, 156/286, 156/287
[51] Int. Cl. ........................................................ B65h 81/03
[50] Field of Search ............................................ 156/170, 193, 195, 286, 287, 285; 93/80, 94; 229/93

[56] References Cited
UNITED STATES PATENTS

| 2,370,193 | 2/1945 | Reid .............................. | 156/285 X |
| 2,931,069 | 4/1960 | McCormick .................. | 156/285 X |
| 2,993,526 | 7/1961 | Young .......................... | 156/190 X |
| 1,944,970 | 1/1934 | Dieffenbach ................. | 156/195 |
| 2,731,067 | 1/1956 | Miller ........................... | 156/193 X |
| 3,037,529 | 6/1962 | Hancik ......................... | 156/190 X |
| 3,376,180 | 4/1968 | Larson et al. ................ | 156/278 X |
| 3,457,130 | 7/1969 | Morrison ...................... | 156/195 X |

Primary Examiner—Carl D. Quarforth
Assistant Examiner—Gary G. Solyst
Attorney—Watts, Hoffman, Fisher and Heinke ABSTRACT: Fibrous strip material impregnated with a hardening material is wound on a hollow open-ended mandrel, continuously advanced through and cured in an in-line infrared heating apparatus and cut into separate lengths after curing. A vacuum applied to the mandrel withdraws gases and vapors from within the tube, enhancing the curing.

PATENTED OCT 26 1971

INVENTORS
PAUL W. STUMP
JAMES A. HUBER
JOHN M. LIPINSKI

BY *Watts, Hoffmann,
Fisher & Heinke*
ATTORNEYS.

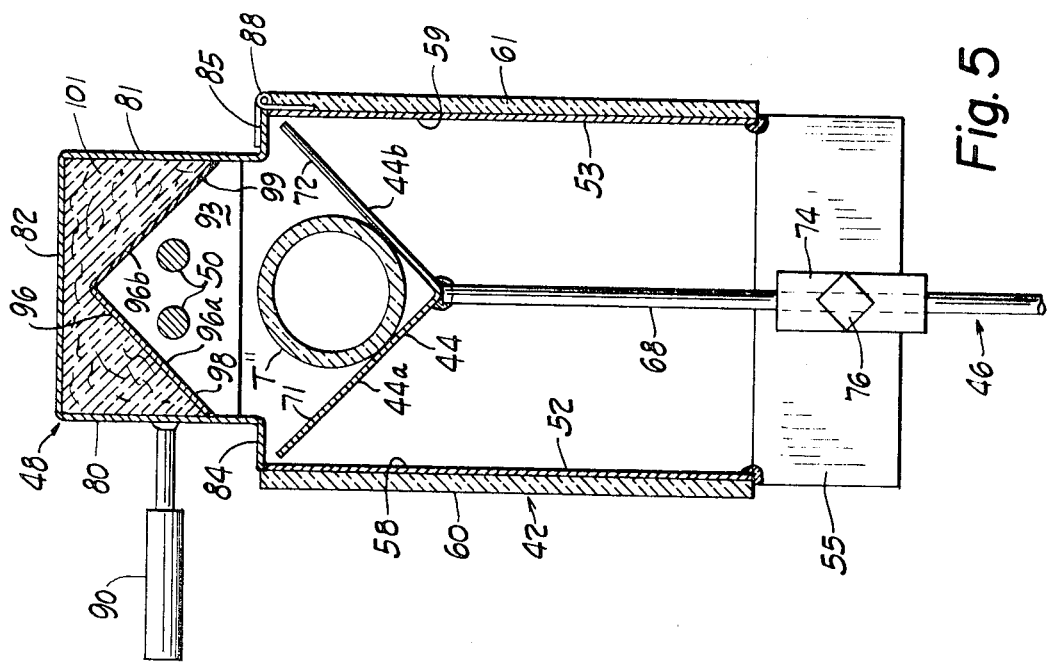
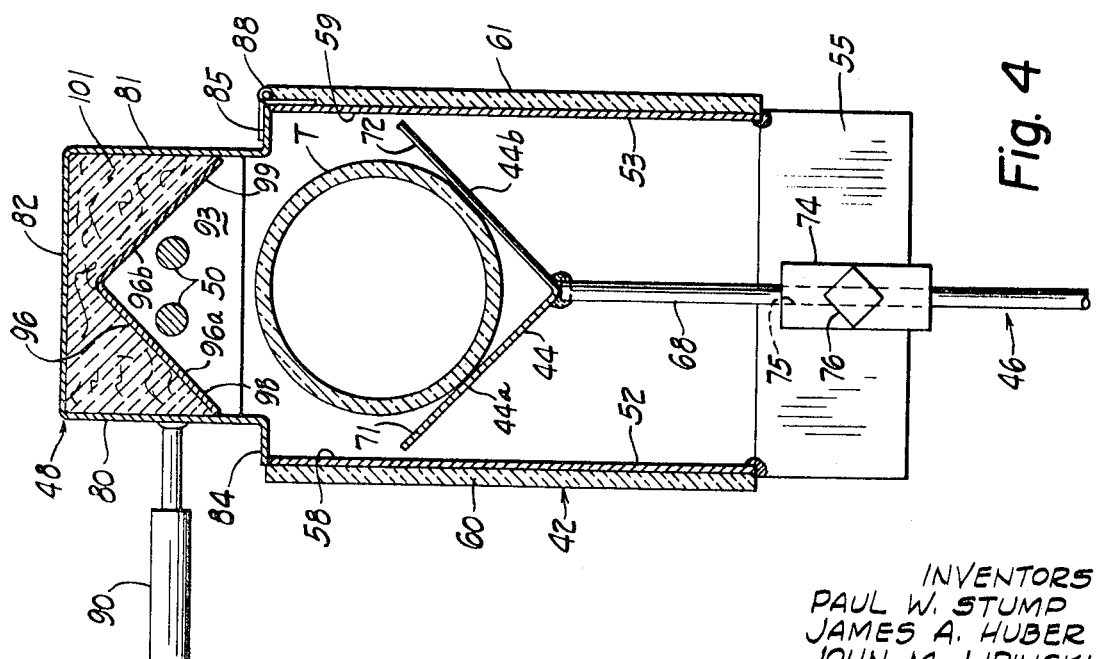

METHOD AND APPARATUS FOR MAKING A HELICALLY WOUND TUBE

This invention relates to improved methods and apparatus for forming helically wound tubes of fibrous material.

Historically, helically formed paper tubes have been first wound of paper strips and subsequently impregnated with a hardening material such as a resin if a tube of high strength is desired. Tubes so impregnated would then be cured in relatively large and expensive furnaces. This procedure is disadvantageous from several standpoints. The curing step is performed as a separate operation requiring additional handling of the tubes, the curing furnaces are relatively large and uneconomical in operation, and the tube is soft when cut before the curing step, resulting in burrs if saw-cut. This has necessitated cutting with a knife and backup mandrel and/or performing a subsequent finishing trim cut after the tube is hardened.

The present invention provides novel and improved methods and apparatus for overcoming the above-mentioned disadvantages and for producing helically wound tubes of high quality efficiently and economically, both from the standpoint of initial capital investment in equipment and in operating speeds and costs.

In order to provide efficient production, the present invention embodies an in-line process that continuously produces a cured helically wound tube from fibrous strips, such as kraft paper, preimpregnated with a hardening material, such as phenolic resin or the like. The tube is continuously formed on a hollow mandrel and is rapidly cured after forming by radiant heat applied to a formed portion of the tube that has been advanced from the forming mandrel. Isolating the application of heat from the mandrel avoids overheating of the mandrel and attendant premature curing of the hardening material. As a result, there is no tendency of the tube to stick to the forming mandrel. Moisture and other vapors from the paper and volatile constituents of the hardening material collect within the tube due to the heat applied during the curing. These vapors or fumes are drawn off internally by a vacuum applied to the inside of the tube through the forming mandrel. This improves the product because it affords better control over the cure by providing a more uniform atmosphere in terms of temperature and humidity or vapor content along the entire length of formed portions of the tube. Optimum curing is important to assure quality cuts when the tube is severed into discrete lengths. Not only does the removal of moisture and volatiles enhance the curing, but also the counter flow of heated gases thereby provided within the tube results in some recovery of heat, by the initially formed portions of the tube, permitting higher production speeds or a shorter furnace.

The degree of cure achieved in the zone in which heat is applied can be conveniently controlled by the speed of the winding or tube formation and the degree to which the tube is cured can be determined by the cutting characteristics of the tube. Thus, by cutting the tube after curing in a continuous in-line process, a cut of improved quality is obtained, and also an online indication of the quality of the cure is provided. Adjustments can immediately be made in the process to vary the degree of cure, if necessary, to obtain maximum production speed consistent with quality cutting of tube lengths so as to reduce scrap.

In-line curing is accomplished with a relatively small elongated furnace structure that consists of inexpensive infrared heating units aligned to support and enclose a formed portion of the tube downstream from the forming mandrel. The length of the curing zone can be easily varied by changing the number of aligned heating units. The heating units support the tube in a reflective trough and have infrared heating elements above the trough. The effective size of the units is adjustable to accommodate tubes of different diameter. High efficiency is obtained with all diameter tubes because the furnace chamber is reduced in size for smaller diameter tubes and reflecting surfaces direct heat to the tube from different angles. In addition, in-line curing utilizes the natural rotation of the tube forming operation to assure the uniform application of heat within the heating units even though the primary heat source is a radiator located only above the tube.

Accordingly, it is an object of this invention to provide novel and improved methods and apparatus for producing a cured helically wound tube from flexible strip material impregnated with a hardening material.

Other objects, features and advantages of this invention will become more apparent as the invention becomes better understood from the following detailed description, when considered in conjunction with the accompanying drawings, in which:

FIG. 4 is a transverse sectional view of the heating unit of FIG. 3 taken along the line 4—4; and FIG. 5 is a transverse sectional view similar to FIG. 4, illustrating the heating unit adjusted to accommodate a smaller diameter tube.

Figure 1:
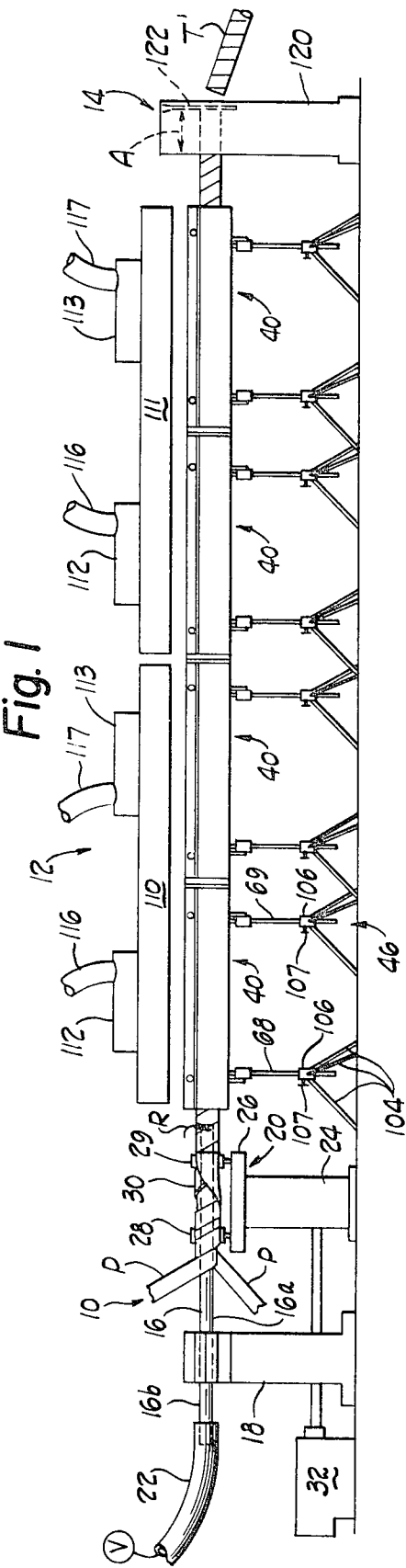
FIG. 1 is a diagrammatic side elevational view showing the general arrangement of a tube forming mechanism, an in-line curing furnace, and a tube cutting mechanism, embodying the present invention.

With reference now to the drawings, a general arrangement of apparatus for producing tubes is shown diagrammatically in FIG. 1. The apparatus includes a tube forming mechanism 10, an in-line curing furnace 12 downstream from the tube forming mechanism, and a subsequent tube cutting mechanism 14. A helically wound tube T is formed by winding at the tube forming mechanism plies P of material impregnated or coated with a hardening material, such as paper strips impregnated with a phenolic resin, and advancing the formed tube through the curing furnace 12 to cure the hardening material. The cured tube is cut into desired lengths T' by the cutting mechanism 14 as the tube advances from the curing furnace.

The tube forming mechanism 10 includes a stationary hollow mandrel 16, a stationary mandrel support 18, and a conventional spiral winder 20.

Figure 2:
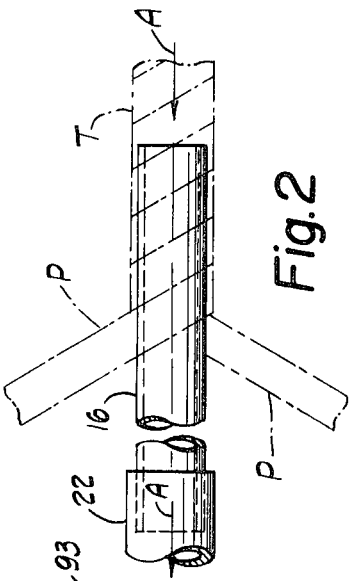
FIG. 2 is a fragmentary side elevational view of a mandrel used with the tube forming mechanism of FIG. 1.

The stationary hollow mandrel 16 is in the form of a cylindrical tube clamped in fixed position by the mandrel support 18 with a forwardly extending portion 16a supported in cantilevered fashion. A rearwardly extending portion 16b is connected by a conduit 22 to a vacuum source V, such as a pump. As best shown in FIG. 2, the mandrel 16 is open at the end of the forwardly extending portion 16a so as to communicate with the inside of a formed portion of the tube T extending from the mandrel portion 16a. The mandrel is also open at the end 16b so as to provide a through passage from the vacuum source V to the inside of the tube T.

The spiral winder 20 includes a stand 24 with a horizontal support 26 that support pulleys 28, 29 on opposite sides of the mandrel 16, in the horizontal plane thereof, and spaced in the axial direction of the mandrel so as to be diagonally aligned across the mandrel 16. An endless belt 30 is trained around the pulleys 28, 29 and one reach of the belt is wrapped about a formed portion of the tube T on the mandrel 16 while the other reach of the belt extends directly between the two pulleys. A motor-drive 32 rotates one of the pulleys 28, 29 causing the endless belt 30 to rotate the tube T in the direction of the arrow R and simultaneously advance it longitudinally along the mandrel 16 toward the curing furnace 12, thereby continuously producing a helically wound tube from the plies P diagrammatically shown in FIGS. 1 and 2. Typically, two to seven plies P will be used to form a tube and the plies will be fed generally horizontally (although shown generally vertically in FIGS. 1 and 2 for purposes of illustration) to the spiral winder 20 from supply reels, not shown. Winding mechanisms and the manner in which plies are arranged and wound to form a tube are well known in the art.

The curing furnace 12 is formed of a plurality of elongated heating units 40 longitudinally aligned with the mandrel 16.

These heating units 40 serve to support and heat formed portions of the tube T after the portions have been advanced beyond the mandrel 16. Each unit 40 is constructed to radiate infrared heat within an insulated enclosure toward the top of the advancing tube T and to reflect heat upward and from the sides toward the tube. The units are also constructed so that the effective size of the enclosure can be varied for different size tubes to minimize unused space within the unit and to support the tube with the center of the tube axially aligned with the mandrel 16.

Figure 3:
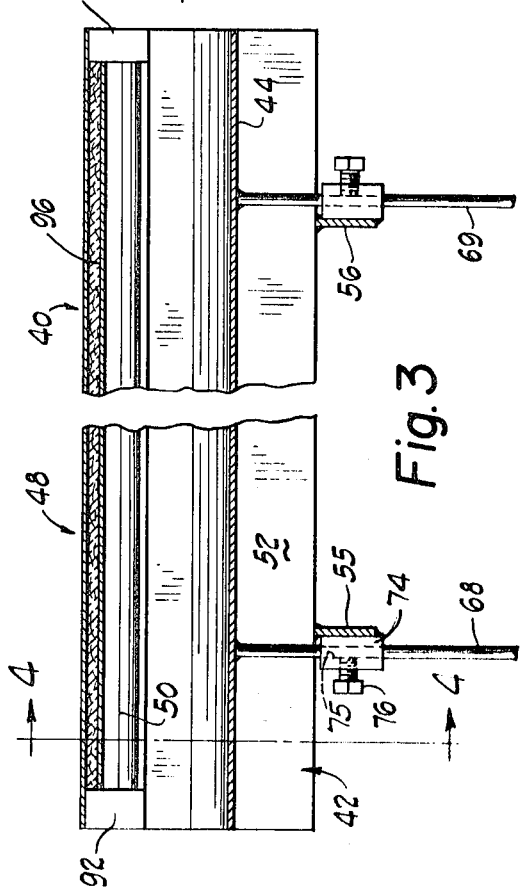
FIG. 3 is a partial longitudinal sectional view of a heating unit of the curing furnace shown in FIG. 1.

As best shown in FIGS. 1, 3 and 4, the heating units 40 include a box frame 42, a reflective tube-supporting trough 44 within the box frame 42, spaced supports 46 independently supporting both the box frame 42 and the reflective trough 44, and a cover 48 having heating elements 50 supported upon the box frame 42.

The box frame 42, as best shown in FIG. 4, is constructed of two flat steel sideplates 52, 53, vertically oriented and extending parallel to each other longitudinally of the unit 40. The two sideplates 52, 53 are secured together by two longitudinally spaced transversely extending steel mounting plates 55, 56 welded to the lower edges of the sideplates. Preferably, each sideplate 52, 53 is provided with an inside reflecting surface 58, 59, respectively. Asbestos insulating panels 60, 61 are attached to outside surfaces of the sideplates 52, 53, respectively.

The reflective tube supporting trough 44 is made of a steel plate in the form of a V, formed by two portions 44a, 44b extending at right angles to each other. Two longitudinally spaced vertically extending support rods 68, 69 are welded at their upper ends to the outer surface of the trough 44 at the junction of the two angularly related portions 44a, 44b. The width of the trough 44, as shown in FIG. 4, is almost as great as the distance between the sideplates 52, 53 so that the trough 44 effectively closes the bottom of the heating unit 40. As shown in FIG. 3, the trough 44 extends longitudinally a distance equal to the length of the sideplates 52, 53. Reflective surfaces 71, 72 are provided on the inwardly facing sides of portions 44a, 44b, respectively, of the trough 44 so as to reflect heat within the unit 40 toward the tube T.

A mounting block 74 is secured to each mounting plate 55, 56 to support the box frame 42 on the support rods 68, 69 along with the trough 44. Each mounting block 74 has a vertical through-bore 75 that slidably receives the support rod 68 or 69. A setscrew 76 is threadedly received in each mounting block 74 at right angles to the through-bore and serves to clamp the associated mounting plates 55, 56 in fixed axial positions along the support rods 68, 69. This arrangement permits adjustment of the box frame 42 vertically relative to the trough 44.

The cover 48 is in the form of an elongated metal channel that has parallel sidewalls 80, 81, a connecting top wall 82, a longitudinal outwardly extending flange 84 formed along the free end of the sidewall 80, and a similar flange 85 formed along the end of the sidewall 81. The channel cover 48 is inverted over the box frame 42 with the two flanges 84, 85 resting along top edges of the steel sideplates 52, 53, respectively. The cover 48 is pivotally connected to the box frame 42 by a hinge 88 connected along the top edge of the sidewall 53 and along the flange 85. A handled 90 extends outwardly from the sidewall 80 so that the cover 48 can be pivoted about the hinge 88 for access to the interior of the heating units. If desired a latch (not shown) can be provided to retain the cover in a closed position.

End walls for the cover 48 are formed by support boxes 92, 93, which fit between the sidewalls 80, 81 and support the ends of the two heating elements 50, which are rod-shaped and extend between the boxes parallel to the trough 44. Electrical connections to the heating elements are provided within the support boxes. The two-heating elements 50 emit infrared radiation when a suitable electrical current is passed through them.

A longitudinally extending cover reflector 96 extends between the support boxes 92, 93 and above the heating elements 50. The reflector 96 is in the shape of an inverted V and formed from a flat, elongated sheet of steel bent longitudinally to provided two angularly related portions 96a, 96b. As shown, the two portions 96a, 96b form a 90° included angle and have reflective surfaces 98, 99, respectively, oriented to reflect heat from the heating elements 50 toward the tube T within the box frame 52. The two angularly related wall portions 96a, 96b span the width between the sidewalls 80, 81 of the cover and the reflector is centered longitudinally above the reflective trough 44. Insulation, such as fiberglas 101, fills the space between the reflector 96 and the outer cover walls 80, 81, 82 to reduce heat loss.

Two-space supports 46 associated with each heating unit 40 are each provided with a tripod base formed of legs 104 (see FIG. 1) that are connected to a collar clamp 106 having a vertically disposed through-bore. The lower end of a support rod 68, which is connected to a trough 44, is slidably received through the collar clamp 106 and is held in a vertically adjusted position by a setscrew 107 in the same manner as described in connection with the mounting blocks 74. Vertical adjustment of the support rods 68 in the collar clamps 106 relative to the base legs 104 permits the height of the trough 44 to be varied relative to the central axis of the mandrel 16 to accommodate tubes T of different diameter. A relatively higher position of the trough 44 and lower position of the box frame 42 with a small diameter tube T" as compared with a larger diameter tube T of FIG. 4, is shown in FIG. 5 of the drawings. This arrangement keeps the central axis of different diameter tubes such as tubes T and T" in the same location and also diminishes the effective size of the furnace chamber for smaller diameter tubes to obtain efficient heating.

As shown in FIG. 1, the heating units 40 are spaced slightly from each other along the length of the formed portion of the tube T to provide for the escape of moisture, gases and vapors from the tube that are formed during curing and which escape to the outside of the tube surface. Two longitudinally aligned hoods 110, 111 extend over the heating units 40 to withdraw gases and vapors that escape from the units. Each hood is provided with plenum chambers 112, 113, which are connected by conduits 116, 117, respectively to exhaust fans (not shown).

The tube cutting mechanism 14 is of conventional construction and is therefore shown only diagrammatically. It is located adjacent and subsequent to the downstream end of the in-line curing furnace 12. The cutting mechanism includes a stationary support 120 that carries a motor-driven rotary saw blade 122 for automatic timed reciprocal movement transversely of the tube T and also for automatic reciprocal movement longitudinally thereof, as indicated by the arrow A'. Longitudinal movement of the saw blade 122 in the direction of tube movement is provided at a speed identical to that of the longitudinal tube movement. The saw blade is reciprocated transversely of the tube T in the path thereof at time intervals that determine the lengths into which the tube is cut. As the blade moves across the tube to sever a length, the movement longitudinally with the tube assures that a right-angle transverse cut is obtained without interrupting the longitudinal movement of the tube T. Thereafter, the blade is returned to its original position preparatory for a subsequent cut.

In operation, a helically wound tube is continuously formed by winding a plurality of strips of plies P around the mandrel 16 in a helical path and advancing portions of a tube T so formed axially along the mandrel and then through the curing units 40 to the cutting mechanism 14. Heat is applied to the tube in the curing units and gases and vapors are withdrawn from inside the formed tube through the mandrel, as indicated by the arrows A in FIG. 2. It will be understood that the end of the tube T at the cutting mechanism 14 is open, permitting a through flow of gases and vapors, including ambient atmosphere. Vapors from outside the tube are withdrawn through the hoods 110, 111. Two to seven plies may be advantageously used and the tubes typically produced will vary in size up to 3 inches in diameter with a wall thickness of up to 0.075 inch. It will be apparent that the tube size is determined by the mandrel diameter and the number of plies and is therefore essentially limited only by the capacity of the equipment.

By way of a typical example that will explain the operation in more detail, four plies of kraft paper may be used to form a tube of 1½ inches inside diameter. The four plies are in the form of relatively narrow strips supplied to the mandrel from reels and the paper is preimpregnated with phenolic resin that cures under the application of heat so as to adhere the plies together and to harden and thereby form a strong and rigid tube. The paper strips are helically wound about a 1½ inch diameter hollow mandrel 16 and advanced along the mandrel and then through the curing furnace 12 by the endless belt 30 of the winding mechanism 20 at a lineal speed of approximately 20,000 inches per hour. The speed of tube advancement and the length of the curing furnace establish a time-temperature relationship that controls the degree of cure that is obtained. It will be apparent that the number of plies used in forming the tube will vary the mass of the tube and this may require adjustments in the speed of tube formation and movement to achieve a proper time-temperature relationship for the curing.

Formed portions of the tube are continuously advanced from the mandrel through the in-line heating units 40. In this example, four 7-foot infrared heating units supply adequate heat to cure the tube traveling at the indicated speed through the units. Infrared radiant energy from heating elements 50 of the units is directed toward the tube from above and reflected back from the sides and the supporting trough beneath the tube. Because the tube is both rotated and advanced, the application of heat is uniform about the entire circumference. As will be apparent from the construction, the heat is radiated downstream from the mandrel and therefore the mandrel is in effect isolated from the direct application of heat. Fumes, such as moisture, vaporized volatile substances of the resin, and the like, are given off by the resin during curing. Fumes escaping to the outside of the formed portions of the tube are collected by the hoods 110, 111 above the heating units 40. Fumes are free to escape from between adjacent heating units, which are slightly spaced from each other. A vacuum is applied to the mandrel 16 to remove fumes within the tube in a direction counter to the direction of tube movement. Through this counter movement of heated gases and vapors, heat that would otherwise be carried from the units is recovered in part by the tube portions entering the heating units from the mandrel. In addition, the withdrawal of the fumes from within the tube reduces the moisture content and hastens the curing process.

By the time the formed portions of the tube reach the cutting mechanism 14, such portions have been cured and are sufficiently hard to be cut by a saw blade in a manner known per se. Because the tube is properly cured, no burrs are formed and it is not necessary to use a knife and a backup mandrel or to apply a subsequent trim cut to provide a smooth finished appearance to the cut lengths. Proper cutting requires an optimum cure and the withdrawal of gases and vapors from the inside of the tube through the hollow mandrel is a primary factor in efficiently achieving the desired and uniform cure obtained in this process. Because a poor cut will result from an improperly cured tube, the cutting operation is monitored to provide an online determination of whether the tube has been properly cured. If necessary, the speed of tube formation and tube travel can be varied to afford more or less time for the curing process.

It will be apparent from the foregoing that an in-line curing process and apparatus has been provided that requires relatively low capital investment, that permits reduced operating costs through efficient in-line curing of the formed tube, and that results in a product of uniform and high quality. The process and apparatus is flexible so that various sizes of tubes can be made without impairing the efficiency of the operation, and the quality of the cure obtained can be conveniently determined while the tube is in process and adjustments can be made to achieve the desired results.

While a preferred embodiment of this invention and a preferred mode of operation have been described in particular detail, it will be apparent that many modifications and alterations can be made therein without departing from the spirit and scope of the invention as set forth in the appended claims.

What is claimed is:

1. In a method of making spirally wound tubes, the steps comprising: providing strips of fibrous material impregnated with a heat-curable resin; winding said strips about a hollow mandrel to form a helically wound tube; advancing formed portions of the tube from the mandrel while forming additional tube portions by continuing to wind the strips about the mandrel; curing portions of the tube by applying radiant energy thereto downstream from the mandrel, considered in the direction of the tube movement, to heat the tube to a temperature at which the resin cures; removing moisture from the fibrous material forming the tube and volatile constituents from the resin, downstream from the mandrel and concurrently with the curing of portions of the tube, by withdrawing vapors from within the tube through the mandrel, in a counter direction to the tube advancement; and severing cured portions of the tube from the continuously formed tube.

2. In a method of making spirally wound tubes, the steps comprising: providing strips of fibrous material impregnated with a heat-curable resin; winding said strips about a hollow mandrel to form a helically wound tube; advancing formed portions of the tube from the mandrel while forming additional tube portions by continuing to wind the strips about the mandrel; passing said formed portions of the tube through a tunnellike enclosure aligned with and downstream from the mandrel, considered in the direction of tube movement; curing portions of the tube by applying radiant energy thereto within said enclosure to heat the tube to a temperature at which the resin cures; removing moisture from the fibrous material forming the tube and volatile constituents from the resin, downstream from the mandrel and concurrently with the curing of portions of the tube, by withdrawing vapors from within the tube through the mandrel, in a counter direction to the tube advancement; and severing cured portions of the tube from the continuously formed tube.

3. The method as set forth in claim 1 including the steps of controlling the degree to which the formed tube is cured by varying the winding speed and hence the rate of tube formation and advancement from the mandrel.

4. The method as set forth in claim 3 including the steps of increasing the speed at which the strips are wound to form the tube when the severing of hardened tube portions from the continuously formed tube indicates that the curing time has been excessive, and decreasing the speed at which the strips are wound to form the tube when the severing of hardened tube portions from the continuously formed tube indicates that the curing time has been insufficient.

5. An apparatus for making a spirally wound tube: a hollow mandrel; means for winding strips of fibrous material impregnated with a heat-curable resin about said mandrel to form a helically wound tube, and to advance formed portions of the tube from the mandrel while forming additional tube portions; means for curing portions of the tube, including a radiant energy source downstream from the mandrel, considered in the direction of the tube movement, that heats the tube to a temperature at which the resin cures; evacuating means connected to said mandrel to withdraw vapors from within the portion of the tube downstream from the mandrel, in a counter direction to the tube advancement, to thereby remove moisture from the fibrous material forming the tube and volatile constituents from the resin; and means to sever cured portions of the tube from the continuously formed tube.

6. Apparatus as set forth in claim 13, wherein said means for curing portions of the tube includes an elongated tunnel or chamber spaced from the mandrel in the direction of tube advancement, constructed to surround a portion of the tube, and formed of an elongated trough extending beneath the tube and supporting the tube, a cover above the tube, radiant energy emitters carried by the cover, side enclosures on opposite sides of the tube, and means to support the trough and cover for independent vertical movement to adjust the size of the tunnel or chamber for tubes of different diameters.

* * * * *